(12) United States Patent
DeConcilis

(10) Patent No.: US 10,932,015 B2
(45) Date of Patent: *Feb. 23, 2021

(54) AUTOMATIC TERMINATION PATH CONFIGURATION

(71) Applicant: LEVEL 3 COMMUNICATIONS, LLC, Broomfield, CO (US)

(72) Inventor: Michael F. DeConcilis, Bloomingdale, IL (US)

(73) Assignee: Level 3 Communications, LLC, Broomfield, CO (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/362,622

(22) Filed: Nov. 28, 2016

(65) Prior Publication Data

US 2017/0150238 A1 May 25, 2017

Related U.S. Application Data

(60) Continuation of application No. 12/551,525, filed on Aug. 31, 2009, now abandoned, which is a division of
(Continued)

(51) Int. Cl.
*H04Q 3/06* (2006.01)
*H04Q 3/66* (2006.01)

(52) U.S. Cl.
CPC ............. *H04Q 3/06* (2013.01); *H04Q 3/66* (2013.01); *H04Q 2213/034* (2013.01); *H04Q 2213/05* (2013.01); *H04Q 2213/13* (2013.01); *H04Q 2213/1305* (2013.01); *H04Q 2213/138* (2013.01); *H04Q 2213/1313* (2013.01);
(Continued)

(58) Field of Classification Search
CPC ...... H04Q 3/66; H04Q 2213/034; H04Q 3/06; H04Q 2213/13; H04Q 2213/1313
See application file for complete search history.

(56) References Cited

U.S. PATENT DOCUMENTS

| | | | |
|---|---|---|---|
| 4,009,344 A | 2/1977 | Flemming | |
| 4,009,345 A | 2/1977 | Flemming et al. | |

(Continued)

FOREIGN PATENT DOCUMENTS

| | | |
|---|---|---|
| EP | 0898430 A1 | 2/1999 |
| WO | WO-2002054787 A1 | 7/2002 |
| WO | 2007082514 A1 | 7/2007 |

OTHER PUBLICATIONS

Canada Examination Report, dated Aug. 7, 2012, Application No. 2667827, 2 pgs.
(Continued)

*Primary Examiner* — Deepa Belur

(57) ABSTRACT

There is provided herein a system and method for automatic configuration of data routings for use with electronic data such as phone calls, faxes, etc. In the preferred embodiment, when more than one carrier might potentially terminate the transmission, the carriers are ordered based on some screening criterion (e.g., transmission price). Data transmissions are then assigned to the carriers based on the sorting order, with the second place and lower carriers (e.g., the higher priced carriers) not being selected unless the first carrier cannot complete the transaction. The switch instructions necessary to implement this scheme are generated automatically.

9 Claims, 4 Drawing Sheets

Related U.S. Application Data application No. 11/590,291, filed on Oct. 31, 2006, now Pat. No. 8,406,221.

(52) U.S. Cl.
CPC ........... *H04Q 2213/13138* (2013.01); *H04Q 2213/13141* (2013.01); *H04Q 2213/13353* (2013.01); *H04Q 2213/13514* (2013.01); *H04Q 2213/13524* (2013.01); *H04Q 2213/13541* (2013.01); *H04Q 2213/13567* (2013.01)

(56) References Cited

U.S. PATENT DOCUMENTS

| | | | |
|---|---|---|---|
| 4,009,346 A | 2/1977 | Parker et al. | |
| 4,009,347 A | 2/1977 | Flemming et al. | |
| 5,043,983 A * | 8/1991 | Dorst | H04M 3/51 370/384 |
| 5,406,620 A | 4/1995 | Pei | |
| 5,440,563 A | 8/1995 | Isidoro et al. | |
| 5,917,537 A | 6/1999 | Lightfoot et al. | |
| 6,473,503 B1 * | 10/2002 | Karau | H04M 3/42144 379/221.13 |
| 6,657,989 B1 | 12/2003 | Hilsenrath | |
| 6,816,483 B1 | 11/2004 | Beckstrom et al. | |
| 6,842,511 B1 * | 1/2005 | Paiz | H04M 15/00 379/115.01 |
| 7,216,147 B2 * | 5/2007 | Blagsvedt | H04L 67/24 455/566 |
| 7,321,932 B1 | 1/2008 | Monga et al. | |
| 7,565,448 B1 | 7/2009 | Schlesener et al. | |
| 7,843,835 B2 | 11/2010 | Yurchenko | |
| 7,860,798 B2 * | 12/2010 | Rubinstein | H04N 21/26216 705/51 |
| 8,150,009 B1 | 4/2012 | Croak et al. | |
| 2002/0141404 A1 | 10/2002 | Wengrovitz | |
| 2002/0146102 A1 * | 10/2002 | Lang | H04M 15/00 379/114.02 |
| 2002/0165961 A1 | 11/2002 | Everdell et al. | |
| 2003/0055985 A1 * | 3/2003 | Corb | H04L 29/06027 709/227 |
| 2003/0061354 A1 | 3/2003 | Burg et al. | |
| 2003/0091032 A1 | 5/2003 | Laxman et al. | |
| 2003/0123436 A1 | 7/2003 | Joseph et al. | |
| 2004/0205190 A1 | 10/2004 | Chong et al. | |
| 2005/0068942 A1 | 3/2005 | Chu | |
| 2005/0157739 A1 | 7/2005 | Nelson et al. | |
| 2005/0190750 A1 | 9/2005 | Kafka et al. | |
| 2005/0220095 A1 | 10/2005 | Narayanan et al. | |
| 2006/0077943 A1 * | 4/2006 | Liu | H04M 7/006 370/338 |
| 2006/0085751 A1 * | 4/2006 | O'Brien | G06F 3/0481 715/727 |
| 2006/0101074 A1 * | 5/2006 | Cancilla | G07C 5/0808 |
| 2007/0053342 A1 | 3/2007 | Sierecki et al. | |
| 2007/0165613 A1 | 7/2007 | Soo et al. | |
| 2008/0037430 A1 | 2/2008 | Wah et al. | |
| 2008/0101235 A1 | 5/2008 | DeConcilis | |
| 2009/0003573 A1 | 1/2009 | Long et al. | |
| 2009/0074173 A1 | 3/2009 | Davis et al. | |
| 2010/0054447 A1 | 3/2010 | DeConcilis | |
| 2010/0061274 A1 | 3/2010 | DeConcilis | |
| 2010/0074251 A1 | 3/2010 | DeConcilis et al. | |
| 2010/0185498 A1 * | 7/2010 | Bechtel | G06Q 10/10 705/7.33 |
| 2012/0257617 A1 | 10/2012 | Bugenhagen et al. | |
| 2013/0275143 A1 * | 10/2013 | Cadger | G06F 19/328 705/2 |
| 2014/0256256 A1 * | 9/2014 | Park | H04W 36/0055 455/41.1 |
| 2018/0048764 A1 * | 2/2018 | Haltom | H04M 3/42042 |

OTHER PUBLICATIONS

Canadian Examination Report, dated May 27, 2016, Application No. 2772756, filed Aug. 16, 2010, 2 pgs.

European Examination Report, dated Mar. 21, 2016, Application No. 10812494.2, filed Aug. 16, 2010, 4 pgs.

Extended European Search Report, dated Jan. 2, 2013, EP Application No. 10812494.2, 6 pgs.

Nortel Neiworks; DMS Global Services Platform, No. 4, Publisher: Nortel Networks; Published in: United States Jun. 2000.

Nortel Neiworks; DMS-Global Services Platform, Publisher: Nortel Networks, Published in: United States Nov. 2000.

Nortel Neiworks; DMS-Global Services Platform, Publisher: Nortel Networks; Published in:United States Aug. 2000.

Nortel Neiworks; DMS-Global Services Platform System Advantage, No. 2, Publisher: Nortel Networks, Published in: United States Jan. 1999.

Worldlink ; Switch Partition, Publisher: Virtual Network, Published in: United States Oct. 31, 2006.

\* cited by examiner

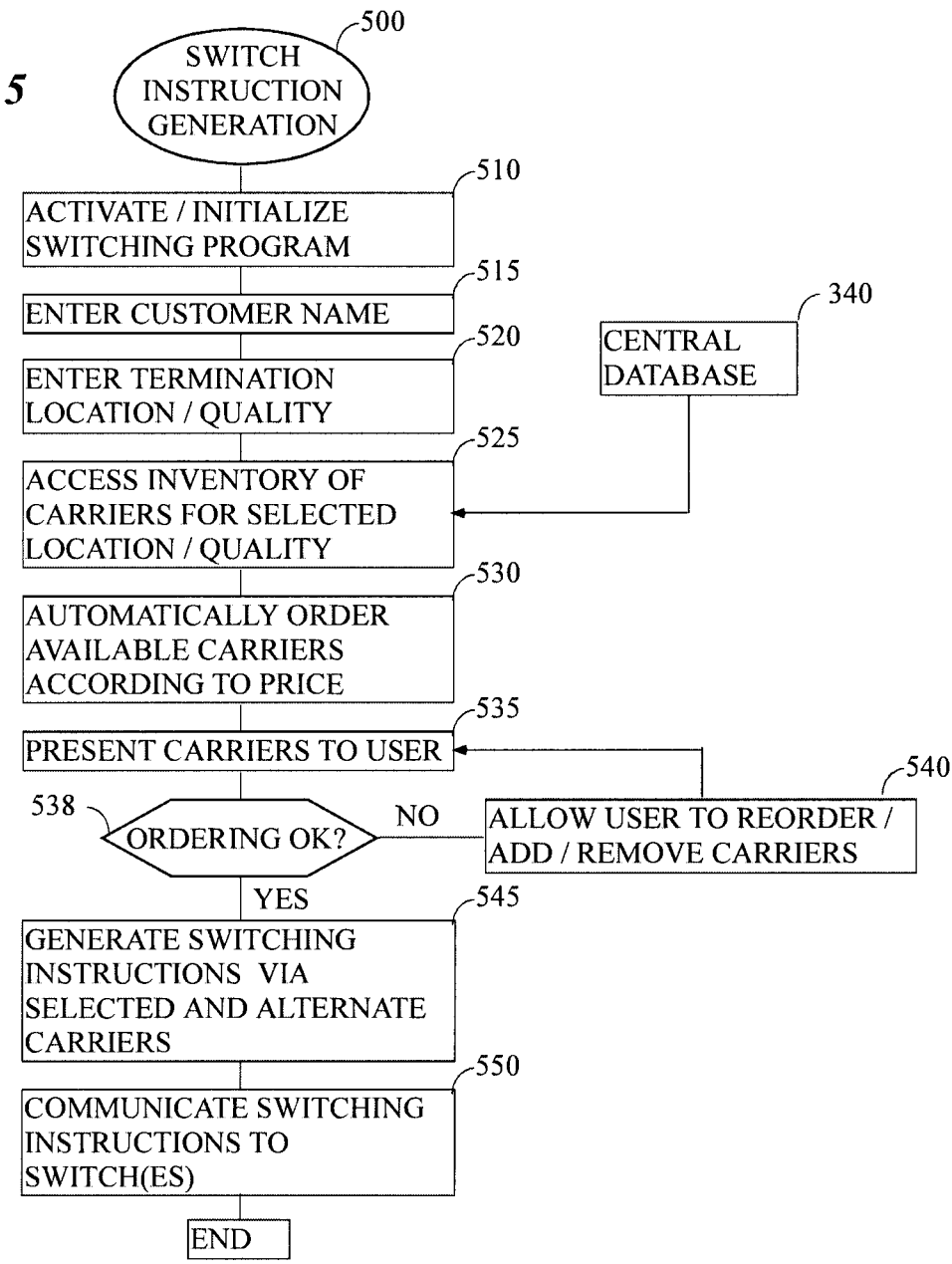

AUTOMATIC TERMINATION PATH CONFIGURATION

CROSS-REFERENCE TO RELATED APPLICATIONS

This application is a continuation of and claims the benefit of priority to U.S. patent application Ser. No. 12/551,525, entitled "AUTOMATIC TERMINATION PATH CONFIGURATION," filed Aug. 31, 2009, the entire contents of which are incorporated by reference herein for all purposes. Application Ser. No. 12/551,525 is a divisional of and claims the benefit of priority to U.S. patent application Ser. No. 11/590,291, entitled "AUTOMATIC TERMINATION PATH CONFIGURATION," filed Oct. 31, 2006, and issued as U.S. Pat. No. 8,406,221 on Mar. 26, 2013, the entire contents of which are incorporated by reference herein for all purposes.

TECHNICAL FIELD

This invention relates to the general subject of transmission and routing of data and, in particular, to methods for transmitting and routing digital information such as telephone calls to an end location via multiple carriers according to time-varying criteria.

BACKGROUND OF THE INVENTION

The general problem of transmitting digital information from a sender to a recipient over a complex network is a well-known one. Of particular interest in connection with the instant application is the problem of moving data such as voice data from an originating source to an end recipient via an intermediary, where the method by which the information is routed is dependent on multiple time-varying factors.

Those of ordinary skill in the art will recognize the general nature of the problem that is confronted by a data intermediary who seeks to connect multiple data originators ("customers", hereinafter) with customer-specified termination points via a multiplicity of possible carriers that could potentially handle the transmission ("carriers", hereinafter). Conceptually the problem is a simple one, i.e., take an order (e.g., accept a phone call, fax, etc.) from a customer, identify a carrier that is able to transmit the data to the required terminus, and then pickup the data from the customer and transmit to the carrier for delivery. For purposes of the instant invention, it will be generally assumed that the termination will take place outside of the United States (e.g., this would occur where a telephone call is made from the U.S. to a foreign country), although that geographic configuration is not a strict requirement.

However, a host of time-varying factors complicate the process of selecting a carrier, one of which is the cost-quality factor, i.e., the routing choice might be based on some combination of the cost, quality, and other factors. That is, and as a first example, each carrier that could possibly terminate the data transmission at a specified location might potentially charge a different rate for such a termination. Of course, it might be expected that these rates will be subject to change (e.g., in some cases hourly). Further, the quality of the communication conduit that each carrier provides may vary between carriers and from time to time. For purposes of illustration in the text that follows, it will be assumed that each carrier provides a data transmission service that can be characterized as being of at least one of two quality levels (e.g., high or low) with some carriers potentially providing all possible quality levels. Of course, those of ordinary skill in the art will recognize that the transmission quality of the conduit offered by a carrier might change from time to time and that there could be additional refinements in the carrier's quality characterization (e.g., three, four, etc., levels of transmission quality). Finally, each carrier has a limited bandwidth that it can offer and once the maximum transmission bandwidth is reached for a given carrier; it will be necessary for the intermediary to secure the required additional bandwidth from one or more other carriers (or, in some cases, it might be necessary to adjust the preferred conduit quality requirement up or down, etc.). As a practical matter, the carrier that offers a combination of the lowest price and highest quality will typically secure orders up to its maximum bandwidth capacity.

In some instances, the intermediary will charge the customer a per-minute (or per byte, etc.) charge for data transmission. Typically, this charge will be based on the then-current fee charged to the intermediary by one or more of the carriers for the same quality of data transmission to the selected location. Of course, the rates charged by the various carriers are subject to change. In some instances, the ability of the carriers to change transmission prices is limited by contract and requires, for example, some number of days of advance notice (e.g., seven days) to the intermediary. From the standpoint of the intermediary, when a carrier changes its pricing structure there is an incentive to do the same with respect to its own customers, and this is especially true in the case where the carrier increases transmission prices. Obviously, it would be to the advantage of the intermediary to immediately increase its own transmission prices in response to an increase from a carrier. However, typically the intermediary is limited in its ability to change its own prices by the terms of contracts it has entered into with its customers, which contracts typically require a similar period of advance notice. In some instances, volume-based discounts may be available from the carrier and/or discounts might be offered to induce an intermediary to move business from one carrier to another.

In other instances, the customer may impose geographic or other routing requirements on the intermediary, which can further complicate the delivery process. For example, some customers may require the intermediary to transmit its data to the intended destination so as to avoid certain countries or travel only through a short list of approved countries. More generally, the mere fact that some customers require routings that are different from the others poses a problem.

In some instances it may be necessary to reroute a data transmission on-the-fly if, for example, a carrier experiences an intermittent problem or if a carrier cannot accommodate the sort of data that is to be transmitted (e.g., if the carrier cannot accommodate a fax transmission). An additional factor that complicates the foregoing is the dynamic nature of this business, with a near constant interaction between sales people, customers, and carriers resulting in the need for near real-time routing adjustments.

The pricing strategy utilized by the intermediary may be further complicated by a decision to, for example, agree to take an unprofitable transmission from a customer as a condition of getting a much larger and more profitable one from the same customer.

Finally, underlying all of the foregoing is the hardware network that implements the ultimate routing decision.

What is needed, then, is a method of automatically determining a voice and data routing that accommodates some or all of the factors described above. Further, such a system should be flexible enough to separately route individual customers if that becomes necessary or desirable.

Heretofore, as is well known in the data communications arts, there has been a need for a method of routing international terminations that does not suffer from the limitations of the prior art. Accordingly, it should now be recognized, as was recognized by the present inventors, that there exists, and has existed for some time, a very real need for a method of routing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a first exemplary embodiment of the instant invention, there is provided herein a system and method for the automatic configuration of data routings for use with electronic data transmissions such as phone calls, faxes, etc. The instant exemplary embodiment is especially useful when applied to the problem of routing international terminations. In the exemplary embodiment, when more than one carrier might potentially terminate the transmission, the carriers are selected in order of some screening criterion (e.g., price). Data transmissions are then assigned to the carriers based on the sorting order, with the second place and lower carriers (e.g., the higher priced carriers) not being selected unless the first carrier cannot complete the transaction. In such an instance, the second, third, etc. place carriers in the sort order will each be offered, in turn, the transaction until one accepts and terminates the transmission.

According to an alternate exemplary embodiment embodiment, there is provided a system and method of automatically configuring a communications path between a customer and a carrier via an intermediary. Preferably, an order will be taken from a customer, a carrier will be identified, a path will be determined automatically or manually, and the routing tables of one or more switches that are within the signal path will be automatically determined and transmitted to the proper switch, thereby creating a signal path that electronically connects customer and carrier.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 5 contains a preferred operating logic suitable for use with the instant invention.

DETAILED DESCRIPTION

Figure 1A:
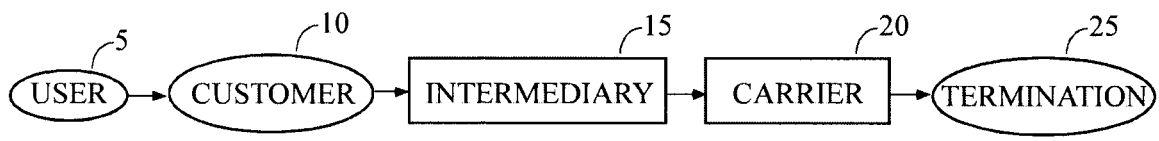
FIG. 1A and FIG. 1B illustrate the general environment of the instant invention.

While this invention is susceptible of being embodied in many different forms, there is shown in the drawings, and will herein be described, some specific embodiments of the instant invention. It should be understood, however, that the present disclosure is to be considered an exemplification of the principles of the invention and is not intended to limit the invention to the specific embodiments or algorithms so described.

GENERAL ENVIRONMENT OF THE INVENTION

Figure 4:
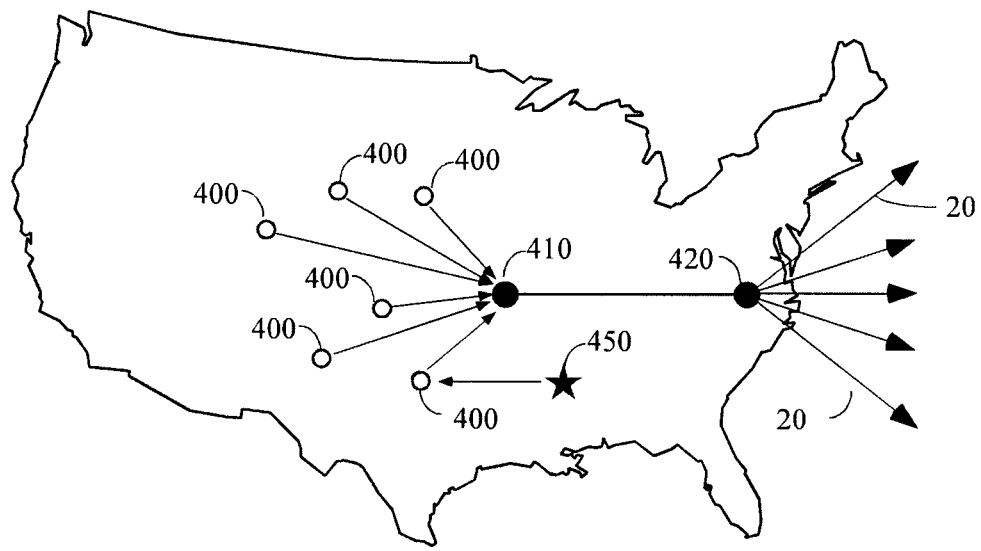
FIG. 4 contains a conceptual drawing of a preferred embodiment of the instant invention.

The instant invention is most preferably used in the environment of international voice and data termination. FIGS. 4 and 1A illustrate in greatly simplified terms the general environment in which the instant invention would characteristically be used. As an aid to understanding the invention taught herein but without any intention to limit the instant invention to the facts of this example, consider the familiar scenario of a user who wishes to place an international telephone call. The user (or the phone owner) will have previously contracted with a local communications (e.g., telephone) company to handle calls that are placed through his or her phone. When the call is placed, it is picked up by the contracting communications company and, without further intervention on the part of the user, is terminated internationally at another phone which has been assigned the number dialed by the user. Of course, the local communications company does not typically carry the phone call the entire distance to its destination, but instead passes off the call to others for actual termination.

Some additional details of the previous scenario are illustrated in FIG. 4. As is suggested in this figure, in a typical configuration one or more telephone companies (or customers 400 hereinafter) will transmit requests for remote termination from their respective users 450 to a local facility location 410 of an intermediary. Note that there might be many such local facility locations 410, although in this simplified example only a single such facility 410 is shown. The facility 410 will typically aggregate the requests from multiple customers 400 (and/or multiple requests from different users 450 of the same customer) and transmit those requests via a high-speed link (e.g., a fiber optic cable) to a centralized location 420, which might be a colocation facility of the intermediary. At this sort of centralized location 420, each signal (e.g., a telephone or fax call) from a customer 450 is handed off to one of potentially many carriers 20 that can transmit the signal on to its intended destination. Examples of customers 400 of the sort contemplated herein include wired and wireless telephone companies such as Sprint®, Cingular®, etc.

Focusing now on the role of the intermediary 15 and turning next to FIG. 1A, in a typical scenario, a user initiates a data transfer request (e.g., he or she might dial a phone number). The call is fielded by a customer 10 which then forwards the data transmission request to an intermediary 15 which is responsible for identifying and selecting a carrier 20 that can take the data transmission on to its intended destination/termination 25. Of course, and as has been mentioned previously, some preferred examples of data transmissions suitable for use with the instant invention include telephone calls, faxes, video/audio programming, etc.

Figure 1B:
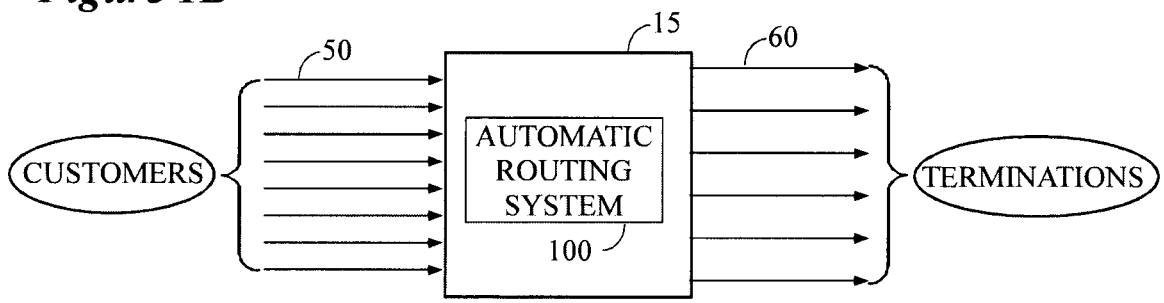

FIG. 1B illustrates in greater detail how a preferred embodiment of the instant invention fits within the schematic of FIG. 1A. That is, in a typical implementation, the intermediary will receive data transmissions 50 from multiple customers. Each of these transmissions might potentially arrive from a different customer, although it is anticipated that each customer will send many data transmission requests to the intermediary 15. The data transmissions 50 might arrive wirelessly, via a wired connection, or some combination of the foregoing.

One principal function of the intermediary 15 is to detect and accept the data transmissions 50 from the customer, determine a best (or at least an acceptable) routing that will take the data to its ultimate destination, secure a carrier 40 to implement that routing, and internally configure switches to cause the data transmissions 50 to be transferred to the appropriate carrier 60. Of course in conjunction with this operation, it should be understood that various financial matters will necessarily need to be administered afterward (e.g., in a typical scenario the customer will bill the user/originator for the call, the intermediary will bill the customer, and the carrier will bill the intermediary). For purposes of specificity only, by way of example in some cases there will be about 50-60 different customers providing data to the intermediary and, perhaps, 40 or so available carriers.

PREFERRED EMBODIMENTS

Figure 3:
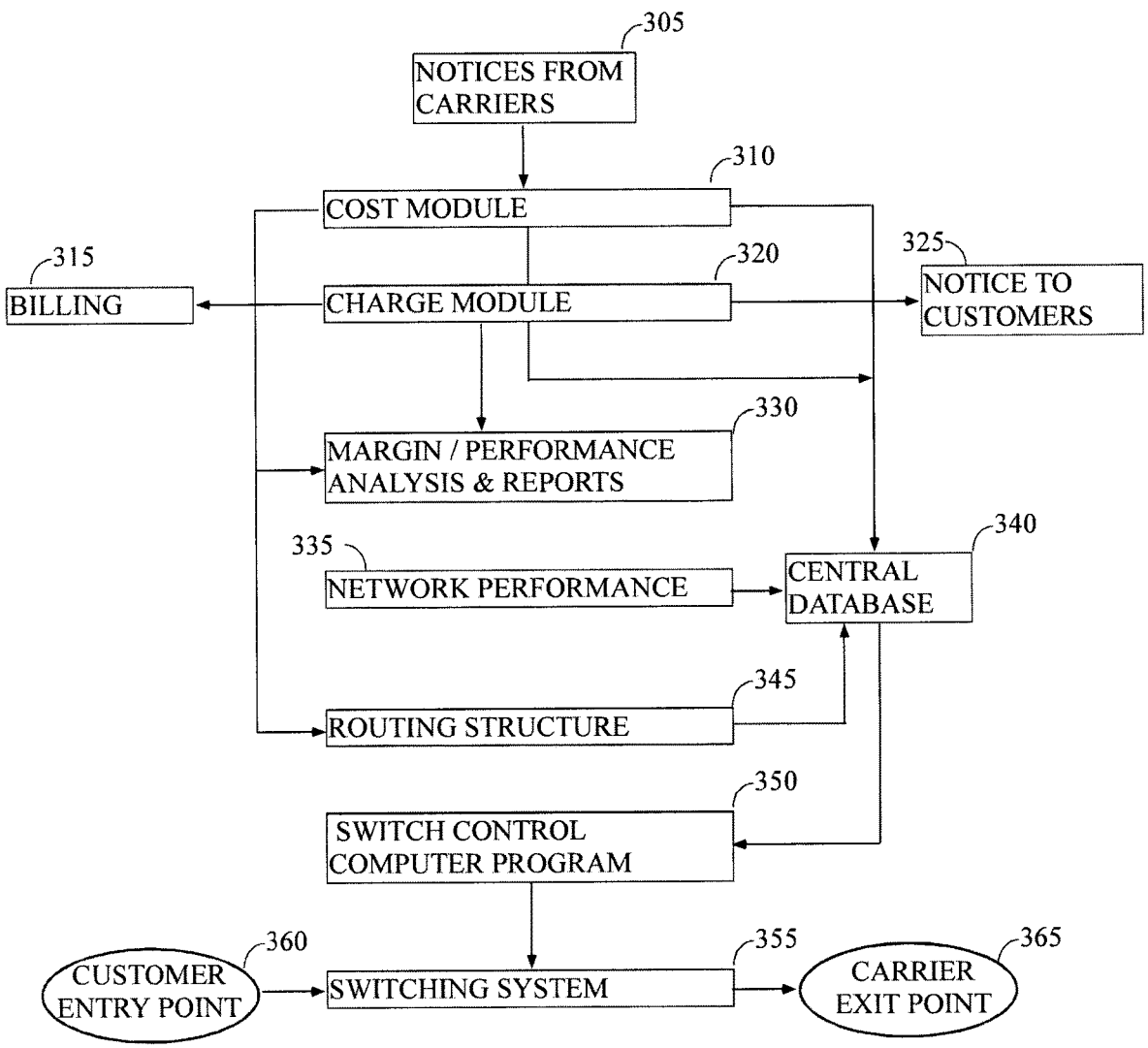
FIG. 3 contains a schematic illustration of system which includes the instant invention.

According to a first preferred embodiment, there is provided a system and method for automatic routing of voice and data transmissions which has a configuration generally as set out in FIG. 3. As is illustrated in this figure, a key aspect of the instant invention is a central computerized database 340 which is designed to hold and make available data that is important to the routing operation discussed hereinafter. Among the sorts of information that might be maintained within this database are the quality level(s) provided by a carrier, its available bandwidth, the current contract price(s) with that carrier, etc. Obviously, the value of each of these carrier parameters could potentially be subject to change at any time, e.g., in some cases they might change hourly. Additionally, the database 340 will preferably additional be used to store information such as the requirements of each customer with respect to, for example, transmission quality, routing instructions, current contract price(s), etc. Finally, in some preferred embodiments the database 340 will contain information relating to the physical configuration of the network, details of the intermediary's internal switching system, a representation of the network topology, etc. Of course, all of the foregoing are just examples of the sorts of information that might be stored in this database 340. Finally, it should be understood that the term "database" is meant to include, not only the information stored therein, but also whatever combination of software and/or hardware might be necessary to access, search, and otherwise utilize the stored information for the purpose of the instant invention. Further, the database itself need not be a hierarchical or other structured database but could be, for example, merely a flat file containing a sequential listing of data records.

In electronic communication with the database are preferably a collection of software and/or hardware modules that are responsible for different aspects of the system's operation, which modules preferably include a software cost module 310 which is responsible for, among other things, intercepting communications 305 (typically sent via e-mail) from carriers that are intended to give advance notice of rate changes. Obviously, if a carrier has raised the price of data transmission, such information will preferably be identified and extracted from an incoming e-mail so that it can be communicated to and stored within the central database 340, thereby potentially making such information potentially available to everyone in the organization who might need to know it. Of course, receipt, identification (preferably automatically), and storage in the database 340 of such notices means that this information is available for use by, for example, the charge module 320 which preferably contains current customer pricing information and other contract details such as the length of advance notice that is required in order to be able to modify each customer's contract, the current terms, etc. So, when notice is received of a price increase from a carrier, a similar notice 325 (based, for example, on a fixed margin or percentage markup) will preferably automatically be sent to the customer(s) who are affected by the price change, thereby reducing to a minimum the length of time that the intermediary must wait pursuant to contract before modifying its own prices accordingly. Similarly, the charge module 320 is preferably used in concert with usage information that might be stored in the database 340 at least for purposes of sending statements to clients (e.g., via billing module 315).

Another aspect of the instant inventive system preferably involves the use of a margin/performance analysis and reporting module 330. That is, in some preferred embodiments the transmission price charged to customers will be a predetermined markup (e.g., percent or flat amount) from the cost to transmit the customer's data via a selected carrier. Preferably the module 330 will be able to automatically make that calculation based on prices charged by each carrier. Additionally, this module 330 will preferably be able to produce printed or electronic reports that summarize the activity of each customer and each carrier and, based on the price differential at the time of the transaction, determine the associated profitability.

As another preferred component of the instant system, a network performance module 335 will preferably be implemented. The network performance module 335 is intended to provide some tracking of the number of data transmission requests that have been delivered to the intended destination (e.g., completed), preferably such tracking being done separately for each carrier. Of course, those of ordinary skill in the art will recognize that this sort of information can be of critical importance in evaluating a carrier's reliability and when making routing decisions.

Preferably in communication with the central database 340 and the cost module 310 is the routing structure module 345. For purposes of the instant disclosure, the "routing structure" of a system will be understood to mean the collection of carriers and associated signal paths that could be used to carry a client's data to a given destination. One preferred aspect of this module 345 is that it will be used to compile an inventory of carriers that can terminate to a particular destination and the cost (and transmission quality, etc.) associated with each. More broadly, the routing module 345 could utilize network performance information (from module 335 or obtained elsewhere) to compile an assessment of the reliability of each carrier as measured by completed data transactions, incomplete transactions (e.g., dropped calls), etc. Note that in the preferred embodiment, the actual routing structure will be determined by reference to the database 340, where information such as cost/quality trade offs for each carrier, customer routing preferences, etc., is preferably available. That being said, in a preferred arrangement the actual routing decisions will be made in conjunction with the information obtained by the routine structure module 345.

As a next preferred aspect of the instant system, a computerized switch control module 350 will be used to convert the routing information into switch instructions, e.g., into instructions that specify how to update the routing tables on the proper switch or switches. That is, and as is described in greater detail below, preferably a signal path will be determined (automatically or manually) between a customer entry point 360 and a carrier exit point 365 (e.g., a port within a switch), the chosen signal path obviously being a function of the components of the switching system 355, the particular customer and carrier, and various other constraints imposed on the transmission by the customer, the carrier, the economics of the transaction, etc. The resulting signal path will preferably be created by communicating switching instructions that have been generated by the module 350 to the switching system 355. Note that such instructions might take the form of physical and/or logical switch commands that are to be executed within each of the possibly numerous electronic switching device that comprise at least a part of the chosen signal path, but preferably the commands will be designed to update the tables on the switch to implement the desired routing. The switch control module 350 will preferably be in electronic communication with the central database 340 and responsive to commands from it including, for example, the chosen routing information. That being said, in some embodiments the preferred routing will be manually determined and such information will be directly entered into the software module 350, thus making the connection to the central database optional.

Figure 2:
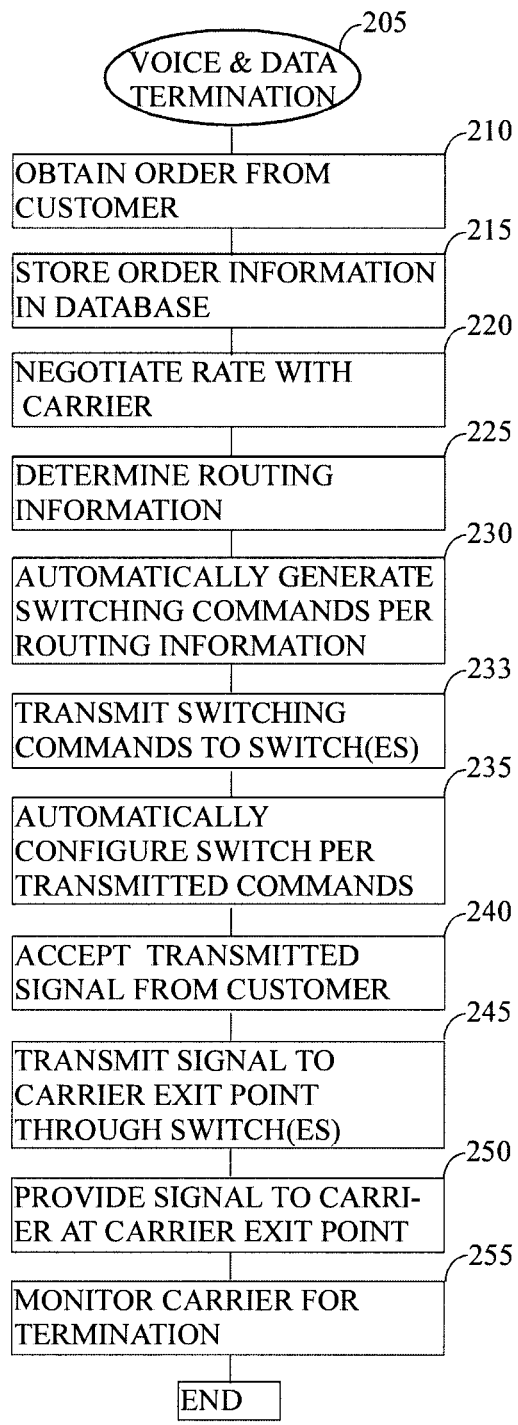
FIG. 2 contains a schematic illustration of a first preferred embodiment of the instant invention.

Turning next to FIG. 2, and according to a preferred aspect of the instant invention, there is provided a preferred method of automatically configuring a transmission path 205. As a first preferred step, an order will be obtained from a customer 210. Those of ordinary skill in the art will understand that this order might be taken verbally, electronically, etc., depending on the nature of the business arrangement. In any case, a typical agreement will entail a contract with the intermediary to carry the customer's data, typically voice and fax communications, from the United States to a foreign country, i.e., an international termination. That being said, it should be clear that the methods disclosed herein would be equally applicable to a local (e.g., within the United States) termination.

As a next preferred step, the information related to the order will be stored in a central database (step 215). Although this step is optional, it is beneficial for a number of reasons. First, central storage of such information makes it possible for others in the organization (e.g., the buyers of carrier bandwidth) to access it. Additionally, after it is stored this information will be readily available in the event that a carrier revises its price upward and all customers who would be affected thereby need to be contacted.

As a next preferred step 220, a rate structure will be negotiated with a carrier that is capable of terminating data transmissions in the customer's designated location. Needless to say, the rate structure will need to be profitable for the intermediary (except, of course, in special circumstances). Note that steps 220 and 220 might occur in any order, e.g., carrier bandwidth might have been secured far in advance of entering a deal with the customer. Unless the same individual happens to secure the carrier contract as negotiated the customer's order, it is likely that the information related to the customer's order will need to be read from the database, which argues for centralized storage of such information so that it will be available for use as needed.

Next, the routing structure between the customer and the carrier will preferably be determined (step 225). In some preferred embodiments, the routing will be determined automatically. In other embodiments, the routing will be determined manually. However, in either case an object of the routing is to specify a path from the customer to the carrier via switching system 355. Note that the switching system 355 might consist of only a single switch but, more typically, could represent tens or even hundreds (or more) interconnected switches wired in series or in parallel. As a simple example, in some cases the customer will have signals that are available for pickup in Los Angeles and the carrier that is handling an international termination has a point of presence in Boston. In such an instance, the routing could involve many different switches and the signal path could travel over many hundreds of miles from its source to its U.S. destination under supervision of the intermediary. As a consequence, it should be understood that the process of determining the routing could be a complex task in some instances. In some preferred embodiments, this step 225 will be performed manually and in other variations it will be performed automatically, depending on the preferences of the intermediary in this regard. Further, such a routing may include contingency routing information in the event that a problem develops along the chosen path or in the event that a selected carrier is unable to carry the transmission. This might happen, for example, if a carrier's capacity is exceeded, if a carrier has technical problems that cause it to be unable to fulfill its obligations, etc. In such a case, it would be useful to have an alternative routing available so as to disrupt service to the customer as little as possible.

As a next preferred step, given the routing information the actual switching instructions will be automatically generated (step 230) and the appropriate switch commands transmitted to the switch or switches that are in the prospective signal path (step 233). That is, each of the various switch or switches that make up the communications network are programmable according to techniques well know to those of ordinary skill in the art, e.g., each switch in the signal path will be sent instructions to update its routing table(s) appropriately. In most cases, a dedicated computer program provided by the switch manufacturer is used to reassign inputs and outputs by transmission and receipt of a series of machine language (or other) instructions. However, in the preferred embodiment of the instant invention this step will be performed by a multi-function computer program that automatically translates the designated routing information into switch instructions.

As a first preferred step in the process of automatically generating the switching instructions, the routing path will be automatically converted to machine readable form, e.g., the routing information will be manually entered into a computer program that has been created for the purpose of generating switching instructions. Of course, such a program may very well have other functions, but at least one function should be to convert the routing information obtained in step 225 into switching instructions for each switch in the signal path between the customer entry point and the carrier exit point.

As a next preferred step, the switching instructions determined in step 230 will be communicated (step 233) and applied to the one or more switches in the signal path (step 235), thereby creating a signal path from the customer's entry point to the selected carrier's pickup point.

Preferably, the instant method proceeds with the reception (step 240) of data from the customer and the transmission of that data from the point of entry to the point where the carrier can pick it up for retransmission (step 245) via the route selected previously (step 225).

Finally, and as a last preferred step, the instant invention will monitor the data that was handed to the carrier for successful termination (step 250). As has been discussed previously, although this might be done for many reasons, one preferred reason for doing this is for purposes of quality control, with transmissions that are not properly terminated being indicative of poor quality on the part of the carrier.

Turning next to a more detailed discussion of steps 225 through 233, as is generally indicated in FIG. 5 in a preferred embodiment the instant switching method 500 will begin with the activation of a computer program by a user (step 510). As is customary in such instances, the program will initialize various internal program variables and prepare to interact with a user. Note that the program might be activated upon the receipt of a new order from a customer, in response to an announcement of a price change from a carrier, etc. Either way, this aspect of the instant invention will work similarly.

As a next preferred step, the user will enter the customer's name (step 515) or some other designation sufficient to identify a customer (e.g., a customer identification number or serial number). In some instances, details concerning the customer's preferences (e.g., quality/price tradeoffs preferences, routing instructions, etc.) might be read from the central database 340 or some other source.

Next, preferably the user will enter information related to the customer's specified termination location (e.g., the chosen country) and/or a preferred transmission quality (step 520) into the program 500. As has been discussed previously, in most cases at the time the order is placed the customer will specify whether there is a preference for a higher or lower quality transmission and such a preference will preferably be indicated at this point. Of course, if this information has not been specified in connection with the current transaction it certainly could be determined, for example, by reference to a preferred or default data quality as might be stored, for example, in the database 340.

As a next preferred step 525, an inventory of carriers that can terminate in the selected country and that can provide the required transmission quality will be accessed, preferably by reading them from the central database 340. Obviously, this step is dependent on the carrier information having been previously stored in the database, with the location and format of such information largely determining how step 525 is to be implemented.

Next, preferably the instant program will automatically sort or otherwise order the carrier inventory according to a predetermine criterion before presenting them to the user (step 530). In the preferred embodiment, the carriers will be sorted by transmission price. That is, and assuming that more than one carrier can terminate in the selected location, the carriers will preferably be sorted in order of increasing price, with the lowest price character being "first" or most preferred. This assumes, of course, that all of the chosen carriers offer the same quality level. In such an instance, price should be a principal consideration and the instant program orders the carriers accordingly. Of course, those of ordinary skill in the art will recognize that the ordering might be made based on any arbitrary performance, quality, or economic-related variable etc., but, for purposes of specificity in the text that follows, it will be assumed that price for the same quality level is used to order the carriers. More generally, for purposes of the instant disclosure the term "screening criteria" will be used to refer to any carrier related variable that might be used to arrange the carriers in order of preference. Further, it is entirely likely that the sort order could be based on multiple ones of the screening variables (e.g., price and quality). Of course, the methods by such multivariable sorts are done are well known to those of ordinary skill in the art.

It should be noted that a primary reason that the carriers are sorted according a variable such as price is to provide a default ordering in the event that a carrier is unable for whatever reason to terminate a given transaction. By way of explanation, preferably the carrier that is sorted "first" in the list will be the lowest-cost provider for a given quality level. Carriers that are sorted further down in the list will be those that are more expensive at the same level of quality. Logically, other things being equal so long as customer's call can be handled by the lowest-price carrier, that carrier will be allowed to terminate the call, thereby maximizing profit to the intermediary. However, if the first carrier cannot complete a call (e.g., if a carrier must reject a call because its bandwidth has been filled) the second carrier in the list will preferably be utilized, and so on.

As a next preferred step, the user will be presented with the ordered list of carriers (step 535) and then asked to approve the list (step 538). If the ordering is acceptable, the program will preferably proceed to the next step. On the other hand, if the user wishes to manually reorder the list, he or she will preferably be given that opportunity (step 540).

The ordered list of carriers will preferably be utilized in connection with the switching system as follows. In one preferred embodiment, a switch such as a DMS-GSP switching system by Nortel® will be used. Switching systems such as this provide a programmer with a variety of options, including automatic rerouting in the event that one carrier in a list cannot or will not accept a data transmission. One means of utilizing this capability is to program the switch to sequentially select the carriers in the order specified at step 538. Then, if the first carrier (e.g., the one with the lowest price) fails to accept the call, the second carrier (next lowest priced) carrier will be automatically selected, and so on. Of course, those of ordinary skill in the art will understand that the switch will be informed of a carrier's rejection of a transmission according to telecommunications conventions that are old and well known in the art.

As a next preferred step 545, the instant program will convert the termination location, as well as the preferred carrier ordering, into switch instructions for use in programming the one or more switches that are situated along the electronic path between the customer and the chosen carrier. Of particular importance when there is more than one potential carrier is the fact that the program 500 should generate the switch instructions (e.g., the switch routing table entries) that are necessary for selecting the chosen carrier—as well as those instructions that provide for the selection of at least one alternative carrier. Those of ordinary skill in the art will understand the sorts of switching instructions that might be generated by this program 500, given the criteria discussed above.

Finally, the switching instructions will preferably be communicated to the switch or switches (step 550) electronically according to methods well known to those of ordinary skill in the art, thereby preparing the signal path for receipt of a data transmission from that customer.

In operation, each item of information (e.g., each packet) that is received from a customer either arrives with—or is assigned—an identifier that might be associated with, among other things, the intended destination of that item. By way of example, each item of information preferably has an associated "destination code" that specifies the intended destination country. The presence of a destination code makes it possible for any switch that sees such data to route it to the chosen destination according to the switch's programming. Thus, when a switching system which has been programmed according to the instant invention is the recipient of such an item of information, it is able to route it internally according to its programming as communicated to it via instruction generation program 500, thereby sending that information along to the country (and ultimately the termination destination) of choice via the carrier (or a preferred alternate carrier) specified previously. Transmissions are usually identified as to the originating customer by reference to a trunk group ID or a similar scheme that is associated with the call or other data transmission.

Finally, and according to still another preferred aspect of the instant invention, there is provided an invention substantially similar to that disclosed above, but wherein each customer might potentially have its own unique routing structure. Said another way, it is traditional in this industry that the carriers that have been chosen for a country will be utilized by every customer that sends data to that country: the "first choice" (or selected alternative) carrier terminates all calls that are intended for that country. This is the case whether the chosen carrier is acceptable to the customer or not.

By way of general background, in most cases, an intermediary of the sort discussed will utilize switches that provide for partitioning. As a specific example, it is known in the art to partition a switch into two different operational areas—one of which handles the high quality data transmissions and another that handles the lower quality transmissions. Of course, the disadvantage of such an arrangement is that every customer will necessarily utilize the same routing. Said another way, when a two-partition (high/low quality) approach is utilized, the understanding is that each customer in the "high quality" partition will utilize exactly the same routing. This can create a variety of problems. For example, if one customer in the high quality partition is having problems terminating a call to a particular fax machine in India, it might be desirable to try an alternative routing to fix the problem. However, if a change in the routing is made to accommodate the customer having problems, every other customer in the same partition will be similarly affected.

However, and according to another preferred aspect of the instant invention, a separate partition is created within the switching device that corresponds to a single customer. Thus, in some circumstances there might be high/low quality partitions and, additionally, one or more partitions that have been assigned to individual customers. This individual-client partition is assigned a routing structure according to the methods discussed previously. Then, customer data that is found (e.g., by reference to a trunk group ID) to be associated with this particular partition—which might be configured for as few as a single customer—is routed in the manner programmed previously, independently of how other customers might be routed to that destination.

For purposes of the instant disclosure, the term "voice" as it applies to the transmission of information between a customer and a carrier should be broadly construed to include traditional telephonic voice signals, as well as fax signals, video signals, and other data signals.

Further, it should be noted that although the instant invention has been largely described in terms of a one-way transmission from a customer to a carrier, in fact the transmission could very well be two-way, e.g., in the case of a telephone call voice data will flow in both directions, typically along the same signal path. As a consequence, when the terms "customer entry point" and "carrier exit point" are used herein, those terms should be understood to include situations where the flow of information includes transmissions from the carrier back to the customer, i.e., the "entry" and "exit" points are actually "access" points.

Finally, it should also be understood and remembered that when reference is made herein to transmitting a signal from a customer to a carrier, that concept should be broadly interpreted to include instances where the signal received from the customer is modified by the intermediary during its transmission. As a specific example, in some cases it might prove to be beneficial to apply data compression, encryption, etc. to the signal received from the customer. In this case, the compressed signal—as opposed to the actual signal received from the customer—will typically be transmitted along the route chosen by the intermediary and then expanded before handing it off to the carrier. The advantages of such a scheme are well known to those of ordinary skill in the telecommunications arts. Of course, and as an example only, unless lossless compression is utilized, the reconstructed signal that is provided to the carrier might be slightly different from the signal that was originally provided by the customer. Thus, in those instances herein where a signal is said to be transmitted from a customer to a carrier it should be understood that the signal might very well undergo one or more transformations during the time that it is under the control of the intermediary and, further, upon exit from the instant system it might differ in some insignificant ways from the signal originally received. Still, the signal provided to the carrier will be, for all practical purposes, the same as the signal that was originally received. As such, when a signal is said to be transmitted from a customer to a carrier herein, it should be understood that so long as the signal that is received by the carrier is substantially the same as the customer's signal, the received signal will be said to be the same signal.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of configuring a signal path between a customer entry point and a termination destination, comprising the steps of:
    a. selecting, from a plurality of carriers that can provide access to said termination destination, a carrier and at least one alternative carrier that can provide access to said termination destination, wherein each of said plurality of carders has at least one screening variable value associated therewith, and wherein selecting comprises.

a.1 ordering a list of the plurality of carriers based on the at least one screening variable value associated with each of said carriers;
a.2 presenting the ordered list of the plurality of carriers to a user;
a.3 after presenting the ordered list to the user, reordering the list of the plurality of carriers based on user input; and
a.4 selecting the selected carrier and the at least one alternative carrier based on the reordered list;
b. negotiating a rate structure with said selected carrier, wherein the rate structure is based at least in part on the cost of access to said termination destination provided by the carrier,
c. determining at least a first routing for a first signal path between said customer entry point and a first carrier exit point accessible by said selected carrier and a second routing for a second signal path between the customer entry point and a second carrier exit point accessible by the at least one alternative carrier, wherein each of the first and second signal paths pass through at least one switching device;
d. encoding at least a portion of said routings in machine readable form, thereby producing machine readable routing information;
e. within a computer program, using said machine readable routing information to create a plurality of electronic switching instructions for use with each of said at least one switching devices, wherein step a further comprises:
e.1 activating a computer program;
e.2 entering said routing information, into said computer program; and
e.3 within said computer program, translating said routing information into a plurality of switch instructions for the first signal path and the second signal path;
f. automatically programming each of said at least one switching devices through which at least one of said first and second routings pass according to at least one of said plurality of switching instructions, thereby creating said first signal path between said customer entry point and said first carrier exit point and said second signal path between said customer entry point and said second carrier exit point;
g. updating at least one routing table on each of said at least one switching devices in said first and second signal paths in accordance with the at least portion of said plurality switch instructions;
h. receiving a voice transmission from a customer via said customer entry point,
i. transmitting a signal representative of said voice transmission from said customer entry point to said first carrier exit point via said first created signal path;
j. providing said signal representative of said transmitted voice transmission to said selected carrier at said first carrier exit point for termination at said predetermined termination destination;
k. using at least said negotiated rate structure to determine a charge for said transmission of step h.; and
l. assessing said charge against said customer.

2. The method of claim 1, wherein said voice transmission is selected from a group consisting of an audio transmission, a video transmission, a fax transmission, and a data transmission.

3. The method of claim I, wherein step i. comprises the steps of:

i.1 compressing said voice transmission to produce a compressed signal;
i.2 transmitting said compressed signal from said customer entry point to said first carrier exit point via said implemented first routing according to said transmitted plurality of switch instructions;
i.3 expanding said transmitted compressed signal to produce an expanded voice transmission; and
wherein step j. comprises the step of:
j.1 providing said expanded voice signal to said selected carrier at said first carrier exit point.

4. A system configured to obtain a signal path between a customer entry point and a termination destination, the system comprising one or more computer based controllers configured to:

select, from a plurality of carriers that can provide access to said termination destination, a carrier and at least one alternative carrier that can provide access to said termination destination, wherein each of said plurality of carriers has at least one screening variable value associated therewith, and wherein selecting comprises:
order a list of the plurality of carriers based on the at least one screening variable value associated with each of said carriers;
present the ordered list of the plurality of carriers to a user; after presenting the ordered list to the user, reorder the list of the plurality of carriers based on user input; and
select the selected carrier and the at least one alternative carrier based on the reordered list;
negotiate a rate structure with said selected carrier, wherein the rate structure is based at least in part on the cost of access to said termination destination provided by the carrier;
determine at least a first routing for a first signal path between said customer entry point and a carrier exit point accessible by said selected carrier and a second routing for a second signal path between the customer entry point and a second carrier exit point accessible by the at least one alternative carrier, wherein each of the first and second signal paths pass through at least one switching device;
encode at least a portion of said routings in machine readable form, to provide machine readable routing information;
within a computer program loaded on the controller, use said machine readable routing information to create a plurality of electronic switching instructions for use with each of said at least one switching devices;
activate said computer program;
enter said routing information into said computer program; within said computer program, translate said routing information into the plurality of switch instructions for the first signal path and the second signal path;
automatically program each of said at least one switching devices through which at least one of said first and second routings pass according to at least one of said plurality of switching instructions, thereby creating said first signal path between said customer entry point and said first carrier exit point and said second signal path between said customer entry point and said second carder exit point;
update at least one routing table on each of said at least one electronic switching devices in said first and second signal paths in accordance with the at least portion of said plurality of switch instructions;

receive a voice transmission from a customer via said customer entry point; transmit a signal representative of said voice transmission from said customer entry point to said first carrier exit point via said first created signal path;

provide said signal representative of said transmitted voice transmission to said selected carrier at said first carrier exit point for termination at said predetermined termination destination;

use at least said negotiated rate structure to determine a charge for said transmission: and assess said charge against said customer.

5. The system of claim 4, wherein said voice transmission is selected from a group consisting of an audio transmission, a video transmission, a fax transmission, and a data transmission.

6. The system of claim 4, in which the one or more computer based controllers is further configured to:

compress said voice transmission to produce a compressed signal; transmit said compressed signal from said customer entry point to said first carrier exit point via said implemented first routing according to said transmitted plurality of switch instructions;

expand said transmitted compressed signal to produce an expanded voice transmission; and provide said expanded voice signal to said selected carrier at said first carrier exit point.

7. At least one nontransitory computer-readable medium storing instructions that, when executed by at least one processor, cause the at least one processor to:

select, from a plurality of carriers that can provide access to said termination destination, a carrier and at least one alternative carrier that can provide access to said termination destination, wherein each of said plurality of carriers has at least one screening variable value associated therewith, and wherein selecting comprises:

order a list of the plurality of carriers based on the at least one screening variable value associated with each of said carriers;

present the ordered list of the plurality of carriers to a user; after presenting the ordered list to the user, reorder the list of the plurality of carriers based on user input; and select the selected carrier and the at least one alternative carrier based on the reordered list;

negotiate a rate structure with said selected carrier, wherein the rate structure is based at least in part on the cost of access to said termination destination provided by the carrier:

determine at least a first routing for a first signal path between said customer entry point and a carer exit point accessible by said selected carrier and a second routing for a second signal path between the customer entry point and a second carrier exit point accessible by the at least one alternative carrier, wherein each of the first and second signal paths pass through at least one switching device;

encode at least a portion of said routings in machine readable form, to provide machine readable, routing information;

within a computer program loaded on the controller, use said machine readable routing information to create a plurality of electronic switching instructions for use with each of said at least one switching devices;

activate said computer program;

enter said routing information into said computer program; within said computer program, translate said routing information into the plurality of switch instructions for the first signal path and the second signal path;

automatically program each of said at least one switching devices through which at least one of said first and second routings pass according to at least one of said plurality of switching instructions, thereby creating said first signal path between said customer entry point and said first carrier exit point and said second signal path between said customer entry point and said second carrier exit point;

update at least one routing table on each of said at least one electronic switching devices in said first and second signal paths in accordance with the at least portion of said plurality of switch instructions, receive a voice transmission from a customer via said customer entry point; transmit a signal representative of said voice transmission from said customer entry point to said first carrier exit point via said first created signal path;

provide said signal representative of said transmitted voice transmission to said selected carrier at said first carrier exit point for termination at said predetermined termination destination;

use at least said negotiated rate structure to determine a charge for said transmission; and assess said charge against said customer.

8. The at least one nontransitory computer-readable medium of claim 7, wherein said voice transmission is selected from a group consisting of an audio transmission, a video transmission, a fax transmission, and a data transmission.

9. The at least one nontransitory computer-readable medium of claim 7, in which the instructions further cause the at least one processor to:

compress said voice transmission to produce a compressed signal, transmit said compressed signal from said customer entry point to said first carrier exit point via said implemented first routing according to said transmitted plurality of switch instructions;

expand said transmitted compressed signal to produce an expanded voice transmission, and provide said expanded voice signal to said selected carrier at said first carrier exit point.

* * * * *